(12) United States Patent
Schnetgoke

(10) Patent No.: US 9,206,743 B2
(45) Date of Patent: Dec. 8, 2015

(54) ARRANGEMENT OF COMPONENTS OF A WIND POWER PLANT

(71) Applicant: REPOWER SYSTEMS SE, Hamburg (DE)

(72) Inventor: Hanno Schnetgoke, Kiel (DE)

(73) Assignee: SENVION SE, Hamburg (DE)

( * ) Notice: Subject to any disclaimer, the term of this patent is extended or adjusted under 35 U.S.C. 154(b) by 0 days.

(21) Appl. No.: 13/793,187

(22) Filed: Mar. 11, 2013

(65) Prior Publication Data
US 2013/0186104 A1 Jul. 25, 2013

Related U.S. Application Data

(63) Continuation of application No. PCT/EP2011/006305, filed on Dec. 14, 2011.

(30) Foreign Application Priority Data

Jan. 10, 2011 (DE) .......................... 10 2011 002 488

(51) Int. Cl.
*F03D 1/06* (2006.01)
*F02C 7/20* (2006.01)
(Continued)

(52) U.S. Cl.
CPC .............. *F02C 7/20* (2013.01); *F03D 1/0658* (2013.01); *F03D 11/0075* (2013.01); *F03D 11/02* (2013.01); *F05B 2280/10302* (2013.01); *F05B 2280/6011* (2013.01); *Y02E 10/721* (2013.01);
(Continued)

(58) Field of Classification Search
USPC ........ 416/204 R; 403/335, 336, 337; 464/182
See application file for complete search history.

(56) References Cited

U.S. PATENT DOCUMENTS 2,879,092 A * 3/1959 Grobel et al. ................. 403/337
3,436,511 A 4/1969 Rath
4,474,651 A * 10/1984 Yauchi et al. ................. 285/329
(Continued)

FOREIGN PATENT DOCUMENTS

DE 8625580.0 12/1986
DE 69114016 4/1996
(Continued)

OTHER PUBLICATIONS

Committee of Stainless steel producers, Review of the Wear and Galling Characteristics of Stainless Steel, Apr. 1978, pp. 1-29.*
(Continued)

*Primary Examiner* — Ninh H Nguyen
(74) *Attorney, Agent, or Firm* — Rankin, Hill & Clark LLP

(57) ABSTRACT

An arrangement of components (12, 13, 30) for a wind power plant. A first component (12, 13) has a flange (15, 130) having a flange contact surface (121, 122, 133). A second component (30) has a flange-mounting surface (131, 132) for a flange (15, 130) of the first component (12, 13). Alternatively, the second component (12, 13) has a flange (15, 130) having a flange contact surface (122, 133) and the flange contact surface (122, 133) of the first component (12, 13) and the flange-mounting surface (131, 132) of the second component (30) are arranged opposite each other, or the flange contact surfaces (122, 121) of the components are arranged opposite each other. At least one flange contact surface (121, 122, 133) of a flange (15, 130) and/or the flange-mounting surface (131, 132) of the second component (30) has an outer coating made of a chrome-steel alloy.

18 Claims, 4 Drawing Sheets

(51) Int. Cl.
*F03D 11/00* (2006.01)
*F03D 11/02* (2006.01)

(52) U.S. Cl.
CPC .......... *Y02E 10/722* (2013.01); *Y10T 29/49229* (2015.01)

(56) References Cited

U.S. PATENT DOCUMENTS

| | | | |
|---|---|---|---|
| 6,723,177 | B2 | 4/2004 | Dearnaley et al. |
| 7,331,761 | B2 * | 2/2008 | Hansen et al. .................. 416/11 |
| 7,780,417 | B2 | 8/2010 | Kirchner et al. |
| 2009/0233721 | A1 | 9/2009 | de Ugarte |
| 2010/0171317 | A1 | 7/2010 | Trede |
| 2012/0241279 | A1 * | 9/2012 | Graham et al. .............. 192/56.1 |

FOREIGN PATENT DOCUMENTS

| | | | |
|---|---|---|---|
| DE | 19733372 | | 1/1999 |
| DE | 102007014860 | | 10/2008 |
| DE | 102007014861 | A1 | 10/2008 |
| EP | 0 573 383 | * | 12/1993 |
| EP | 0573383 | A1 | 12/1993 |
| EP | 2075466 | | 7/2009 |
| FR | 2367943 | * | 5/1978 |
| FR | 2367943 | A1 | 5/1978 |

OTHER PUBLICATIONS

Belperin, Connecting Device Between Two Rotors, May 1978, Machine translation of FR 2367943.*
Unger, Comparison of deposits of wires applied by welding, thermal spraying, and spray and fuse, Aug. 2008,Welding Journal, pp. 50-53 (the Welding Journal article).*
International Search report filed in PCT/EP2011/006305 (publication No. WO 2012/095140).
Polymet; Data Sheet, Mar. 2007, Cincinnati OH.
Schwartz; "Encyclopedia of Materials, Parts, and Finishes"; CRC Press, Boca Raton/London/New York/Washington DC; Dec. 31, 2001; XP055156214.
Miller; "Frequently asked questions about hardfacing"; Mar. 8, 2005; Retrieved on Dec. 2, 2014 from URL: http://www.thefabricator.com/article/cuttingweldprep/frequently-asked-questions-about-hardfacing; XP055156218.

* cited by examiner

ARRANGEMENT OF COMPONENTS OF A WIND POWER PLANT

BACKGROUND OF THE INVENTION

1. Field of the Invention

The invention relates to an arrangement of two components of a wind power plant. A first component has a flange having a flange contact surface, and the second component has a flange-mounting surface for the flange of the first component, or the second component has a flange having a flange contact surface. The flange contact surface of the first component and the flange-mounting surface of the second component are disposed opposite each other, or wherein the flange contact surfaces of the two components are disposed opposite each other. The invention further relates to the use of a coating for an arrangement of components of a wind power plant and a wind power plant.

In the prior art, a wind power plant of the patent applicant is for example known under the name "5M", which has a nominal power of 5 megawatts (MW).

In order to connect large-volume components of a wind power plant during installation, maintenance or repair, flange connections or screw connections are provided between the components. Such components, which are connected together, are for example the rotor shaft and the drive input and the rotor hub and the rotor shaft.

Moreover, screw connections are used for the connection of the tubular tower with the pivot bearing and the machine support of a wind power plant with the other components of a wind power plant, in particular the connection to the rotor bearing, the gearbox mounting, the axle journal and the (ring) generator.

2. Description of Related Art

The document DE 197 33 372 C1 discloses a rotor blade, or respectively a rotor, of a wind power plant, wherein the rotor blade is connected to a flange of a rotor hub by means of screw connections. In this case, the flange is typically formed as a metal flange. The rotor blade itself is composed substantially from a glass fiber reinforced epoxy resin composite material.

The document DE 691 14 016 T2 discloses generally a coupling between face surfaces, opposite from each other, of two coaxial components rotating together, wherein the face surfaces, opposite from each other, run radially with respect to the axis of the components. Furthermore, the face surfaces of the components are provided with a plurality of closely neighboring channeling lines, which define grooves.

In addition, the document DE 86 25 580 U1 discloses generally a coupling to rigidly connect two coaxial machine parts suited for transferring torque with two coupling assists, which contact each other at the face surfaces thereof and can be braced together using connection elements. Furthermore, it is provided that a layer of granular material is applied between the contact surfaces in the region of the axially tensioning connection elements.

BRIEF SUMMARY OF THE INVENTION

The object of the invention is to connect together large-volume components of a wind power plant forming a high-strength connection.

This object is solved by an arrangement of two components of a wind power plant. A first component has a flange having a flange contact surface, and the second component has a flange-mounting surface for a flange of the first component, or the second component has a flange having a flange contact surface. The flange contact surface of the first component and the flange-mounting surface of the second component are arranged opposite from each other, or wherein the flange contact surfaces of the two components, each formed having a flange, are arranged opposite from each other. At least one flange contact surface of a flange of a component and/or the flange-mounting surface of the second component has a, preferably outer, coating made of a chrome-steel alloy, or that both flange contact surfaces of the flanges of the first and the second component have a, preferably outer, coating made of a chrome-steel alloy.

According to the invention, components of a wind power plant with a diameter of more than 0.5 m, preferably more than 1.0 m, more preferably more than 1.5 m, are connected together, wherein the two components to be connected together each have contact surfaces facing each other and the components are or become braced together in the connected state.

With the arrangement of large-volume components according to the invention, it is provided in one embodiment that one component has a flange with a corresponding flange contact surface and that the second component connected to this component has a corresponding flange-mounting surface for the flange of the first component. In a further embodiment, it is provided in the scope of the invention that the two connected, or to be connected, components each have a flange with respective flange contact surfaces.

Here it is provided according to the invention that the flange-mounting surface of the flange-free component formed as a contact surface has a, preferably applied, coating with, or composed of, a chrome-steel alloy, and/or at least one flange contact surface of a flange has a, preferably applied, coating with, or composed of, a chrome-steel alloy. Thereby, with the connection of the components at least one or both contact surfaces lying opposite each other are formed having an appropriate chrome-steel alloy layer. Thus, the connection of mechanically loaded components, or respectively components, of the wind power plant is attained. Due to the use of the chrome-steel alloy as a preferably subsequently applied or applied overlay on one of the two contact surfaces of the components connected together, or to be connected together, a force-locking connection is formed which has an increased coefficient of friction compared to a connection of components without chrome-steel alloy or a chrome-steel alloy layer on the contact surfaces.

In the scope of the invention, a component is understood to be in particular a functional group or system group, or respectively a functional unit or system unit of a wind power plant, e.g. a rotor hub, a rotor shaft, a gearbox, which is or becomes mechanically coupled with another functional group/system group or functional unit/system unit of the wind power plant via the connection according to the invention, in particular a screw connection or flange connection. The components or functional units and system units are in particular large-volume components with weights of more than 100 kg up to several tons.

In particular, during normal operation of a wind power plant, there is no movement with respect to each other of the contact surfaces of the two components connected together. Preferably the contact surfaces provided with a chrome-steel alloy layer of the components connected together have a diameter of more than 0.5 m, preferably more than 1.0 m. Here the two components to be connected together each have facing contact surfaces, wherein the contact surfaces are or will be braced together in the connected state, and wherein a coating composed of the chrome-steel alloy is applied as a layer or overlay on the contact surfaces.

It has been shown in the use according to the invention that the coating material chrome-steel for static friction surfaces with torsion loaded components of a wind power plant has a surprisingly strong effect increasing the coefficient of friction with simultaneous high cost-effectiveness, great ease of repair, and a simpler coating method.

Furthermore an embodiment of the arrangement is characterized in that the coating, or the coatings, composed of chrome-steel alloy, on the flange contact surfaces or flange-mounting surfaces of the components is/are or will be applied using an arc welding method onto the respective flange contact surface and/or flange-mounting surface, preferably as layer(s) or according to the type of overlay. In particular, the chrome-steel alloy layers are applied on the components after the production of the components and before the assembly of the individual components of a wind power plant.

In one alternative it is provided that the chrome-steel alloy layers are applied as a coating of the contact surfaces on a wind power plant, e.g. while performing maintenance work on the components. Hereby, during the repair of components or maintenance of a wind power plant, if applicable, an (already) existing coating or layer of another type is removed from the contact surface of the component so that the prepared contact surfaces of the components to be connected together are coated with a coating or layer of the chrome-steel alloy.

Thus in the scope of the invention, using chrome-steel, a coating material is provided for example for the coating of flange connections in the drive train of wind power plants, wherein the application of the chrome-steel alloy layer is simple and cost-effective. Because it is possible that the application of the layer composed of the chrome-steel alloy layer is performed subsequently, for example while performing maintenance work at the already erected wind power plants, the handling is also easy to repair and apply. In addition, it is possible, by coating the contact surfaces of components with a chrome-steel alloy during maintenance work at a wind power plant, to improve the properties of the existing components.

The coating method is very easy and flexible in the application, such that large or large-volume components of a wind power plant can be coated. Preferably the (layer) thickness of the coating with the chrome-steel alloy is less than 1 mm or a fraction of a millimeter. Preferably the layer thickness of the chrome-steel alloy applied on the contact surfaces amounts to between 10 μm to 1000 μm, particularly between 400 μm and 600 μm.

The components are braced together, in particular using connection elements, preferably screws or bolts.

Furthermore, the arrangement is characterized in that the chrome-steel alloy coating on cast material for a rotor shaft and/or a rotor hub and/or a rotor locking disk, with compressions due to pretensioning of 125 MPa, has coefficients of friction in the range from 0.5 bis 0.7, particularly from 0.55 to 0.65, particularly from 0.59 to 0.61, and/or with compressions of 75 MPa has coefficients of friction in the range from 0.36 to 0.56, particularly from 0.41 to 0.51, particularly from 0.45 to 0.47, and/or that the chrome-steel alloy coating on cast material for a planet carrier, with compressions due to pretensioning of 75 MPa, has coefficients of friction in the range from 0.36 to 0.56, particularly from 0.41 to 0.51, particularly from 0.44 to 0.48.

Higher coefficients of friction, or friction coefficients, allow the flanges or components to be formed more compactly. The attainable friction coefficient or coefficients of friction decrease with increasing mechanical strength of the base material.

A further great advantage of the chrome-steel alloy coating compared to the zinc spraying of contact surfaces of components of a wind power plant, known from the prior art, lies in the fact that the flange, zinc sprayed on both sides, tends to bond under pretensioning, whereby the connection of the components can be disconnected only with difficulty and typically not without damaging the coating, for example during maintenance work. By applying a chrome-steel alloy layer (instead of a zinc spraying) on the contact surfaces of the components, when loosening the connection, the components can be disconnected or separated from each other without damage.

In addition it is preferred to dispose one or more connection intermediate bodies between the flange contact surfaces of the flange, or one or more connection intermediate bodies are disposed between the flange contact surface of the first component and the flange-mounting surface of the second component. The use of the connection intermediate bodies between the components to be connected together has the advantage that the coefficient of friction, which is also designated as the friction coefficient, is increased without having to directly coat the components that are to be connected. In doing so it is advantageous to apply the coating on substantially smaller, more compact connection intermediate bodies.

In addition it is preferred in one embodiment that the connection intermediate body or bodies are provided with a coating composed of chrome-steel alloy at least on one or on both contact surfaces which are disposed opposite the contact surfaces of the flange or the flange-mounting surface of the second component.

In addition, the connection intermediate bodies are advantageously plate-shaped or formed block-like, thereby resulting in simplified handling of the connection intermediate body during assembly. Thereby, in that small segments are disposed as connection intermediate bodies, coated with a chrome-steel alloy, between a flange-mounting surface and a flange of a component, or between the flange contact surfaces of two flanges, it is possible that small segments are or will be coated inexpensively. After the assembly or the repair of the components, the connection bodies disposed as intermediate elements can also be exchanged easily, which increases the handling of the intermediate connection bodies in a corresponding manner.

Advantageously, it is further provided that the intermediate connection bodies form a type of segmented ring, in particular a segmented annular ring or parts thereof, for or through arrangement between the first component and the component.

Preferably, the connections to the first component and to the second component are connected mechanically using assembly elements, particularly screws, clamps or the like.

By using the assembly elements, the segmented connection intermediate bodies are connected to a component for example such that then the second component having a contact surface is disposed on the one side of the connection intermediate body.

Furthermore, for forming a connection between the two components, it is provided that the flange contact surface of the first component and the flange-mounting surface of the second component, or the flange contact surfaces of the second component, are formed ring-like and/or closed.

In particular, the first component is formed as a rotor shaft and the second component as a rotor locking disk. In one alternative, the first component is formed as a gearbox input shaft and the second component as a rotor locking disk. In an advantageous embodiment, the first component is formed as a rotor hub and the second component is formed as a rotor locking disk or as a rotor shaft.

Advantageously, the connection of the components which have a connection diameter for example of 0.5 m to 2.5 m is formed as a force-locking, and particularly detachable, connection in particular transverse force loaded and/or torsion loaded connection or screw connection.

In addition, the first component and/or the second component which are or will be connected together, are preferably formed as cast components. Alternatively preferred is the design as a structural steel component.

A further solution of the object follows from using a coating for an arrangement or connection of components of a wind power plant, wherein the arrangement or the connection is formed according to one of the preceding example embodiments.

The object is also solved by a wind power plant, which is provided with an arrangement of components described above. We expressly refer to the above explanations in order to avoid repetitions.

The object is solved in addition by a method for processing at least one component of a wind power plant for an arrangement of components as described above, wherein in particular the component(s) of the wind power plant are formed with a diameter of more than 0.5 m, preferably more than 1.0 m, further preferably more than 1.5 m and are or will be connected to each other. The components that will be connected together each have contact surfaces facing each other, and are or will be braced together in the connected state of the components, that is further developed in that at least one contact surface of the components to be connected together is coated with a chrome-steel alloy.

Using this method according to the invention, a flange of a component of a wind power plant (e.g., rotor shaft, rotor hub, etc.) is processed for example so that the flange is repaired.

For repairing the flange, with an existing wind power plant, the connection or the (connected) arrangement of the components that are connected together, is disconnected in a first step. Then at least one of the contact surfaces of the components intended for the connection of the components is cleaned. The cleaning step comprises, in one embodiment, particularly the removal of an existing coating on the contact surface or on the contact surfaces. If, for example, an existing coating, e.g. a zinc spraying, of a contact surface of the component is damaged, then it is provided in the scope of the invention that the damaged or defective coating is removed from the component contact surface. With two components connected together or to be (re)connected together, in particular the two contact surfaces of the respective component disposed opposite each other are prepared for the provided coating with a chrome-steel alloy, that is, are cleared or cleaned.

Next, after the treatment and cleaning of the contact surfaces of the components, a coating or an (outer) layer is applied with chrome-steel or with the chrome-steel alloy on the respective contact surface of the respective component.

With subsequent application of the chrome-steel alloy on the contact surfaces of the components, e.g., while performing maintenance work, it is provided in the scope of the method according to the invention to perform this in the machine cabin of existing, installed wind power plants. In doing so, the chrome-steel alloy coating or layer is formed subsequently on the components in an already erected wind power plant, for example using an arc welding method.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general intent of the invention, based on exemplary embodiments in reference to the drawings, whereby we expressly refer to the drawings with regard to the disclosure of all details according to the invention that are not explained in greater detail in the text. In the figures.

In the following figures, the same or similar types of elements or corresponding parts are provided with the same reference numbers so that a corresponding re-introduction can be omitted.

DETAILED DESCRIPTION OF THE INVENTION

Figure 1:
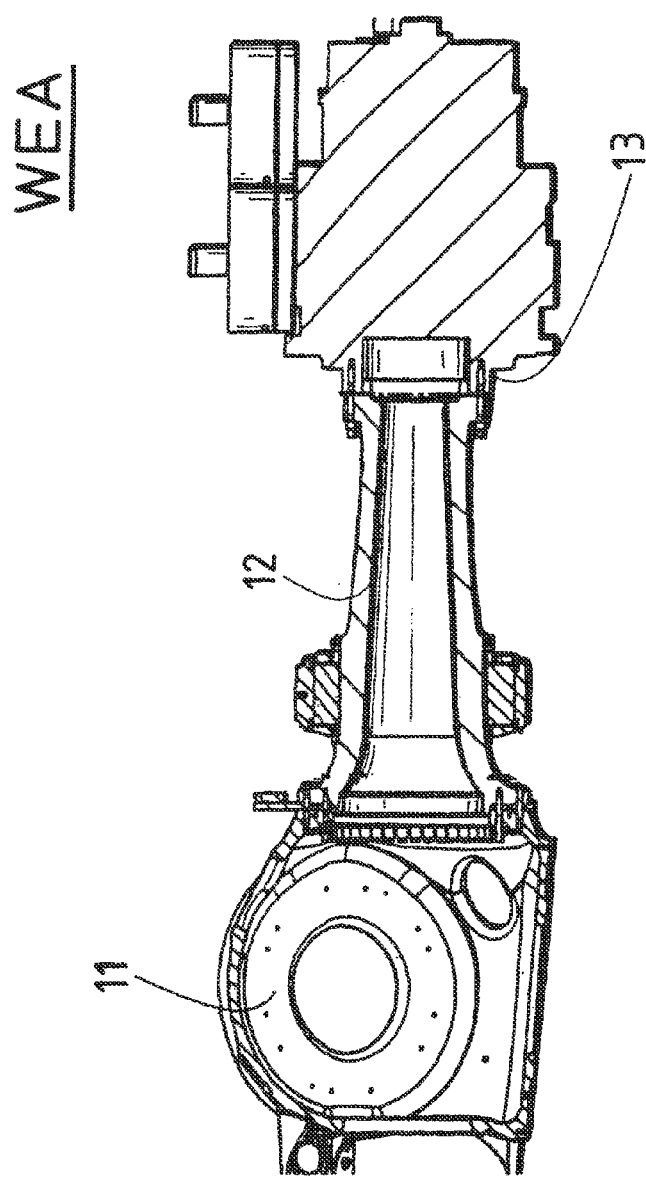
FIG. 1 is a sectional elevation view of connections of a rotor shaft to a rotor hub and a gearbox of a wind power plant.

FIG. 1 shows a schematic cross-section of the connected arrangement of a rotor hub 11 to a rotor shaft 12 and a connection part 13 of a corresponding gearbox of a wind power plant. The rotor hub 11, the rotor shaft 12 and the gearbox, not shown further in the cross-section, which has the connection part 13 in the front region, are parts of a schematically indicated wind power plant WEA.

Figure 2:
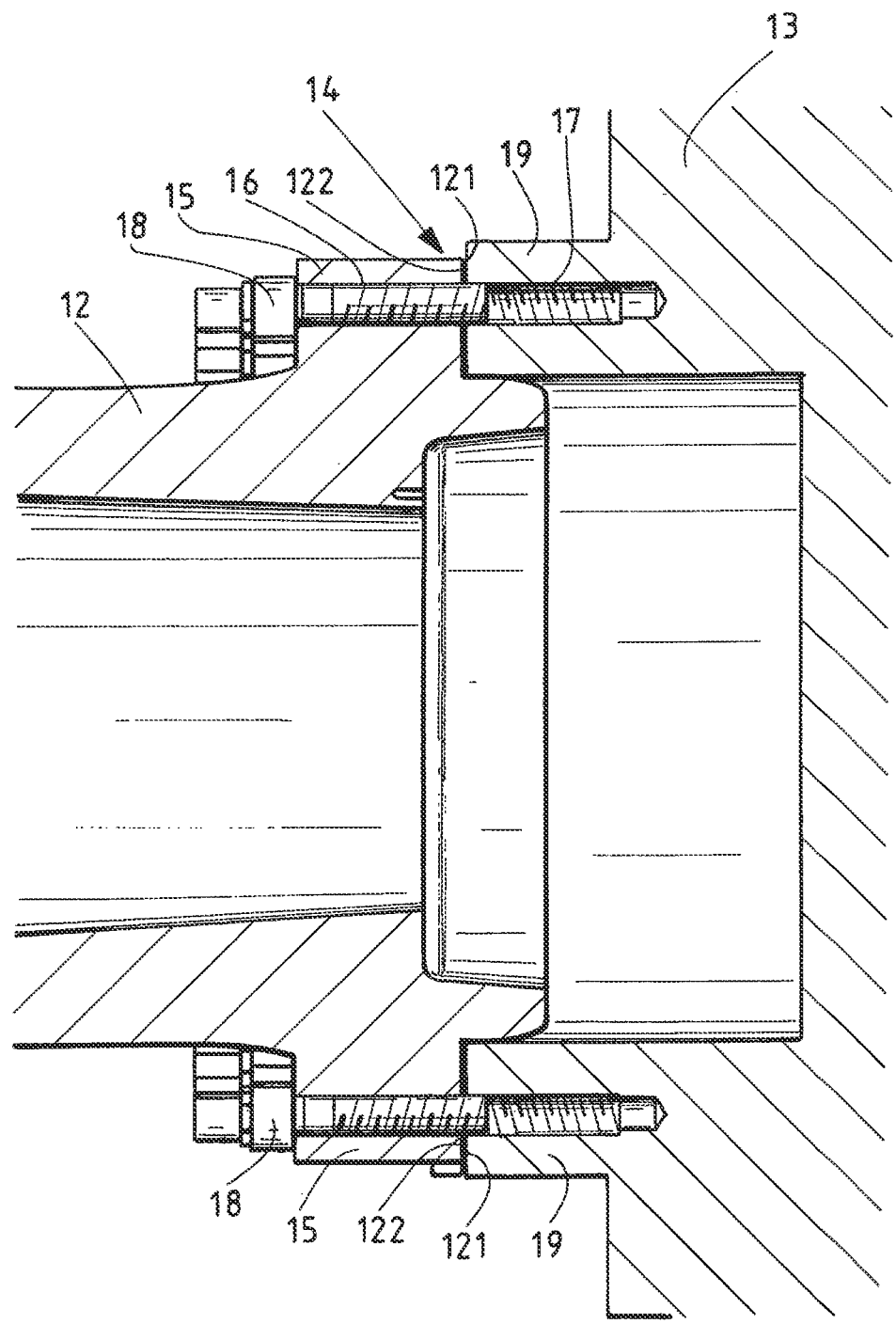
FIG. 2 is a sectional elevation view of the connection transition of the rotor shaft to the gearbox.

FIG. 2 shows a schematic detailed view of the connection transition between a rotor shaft 12 and a gearbox of a wind power plant. The rotor shaft 12 is connected to the connection part 13 of the gearbox by means of a flange connection 14. For this, the rotor shaft 12 has a flange ring 15, which has corresponding bore holes 16 for receiving screws, on the ends facing the connection part 13. The bore holes 16 are disposed at regular intervals around the perimeter of the flange ring 15. The connection part 13 of the gearbox has, on the side facing the rotor shaft 12, corresponding tapped blind holes 17, which have corresponding threads. From the rotor shaft side, screws 18 with threads are inserted into the bore holes 16 of the rotor shaft 12 and the bore holes 17 of the connection part 13 so that the rotor shaft 12 is connected to the connection part 13 under the formation of preloading.

The connection part 13, on the side opposite the rotor shaft 12, has a flange ring 19, which has a flange contact surface 122. The flange ring 15 of the rotor shaft 12 further also has a flange contact surface 121, which is disposed opposite the flange contact surface 122 of the flange 19 of the connection part 13.

In one embodiment, the flange contact surface 122 of the flange ring 15 is provided with a coating of, or composed of, a chrome-steel alloy, preferably subsequently applied. In addition, the flange contact surface 121 of the flange ring 19 of the connection part 13 can also be provided with a chrome-steel alloy.

In a further embodiment, it is also conceivable that the flange contact surface 122 of the flange ring 19 is coated with a chrome-steel alloy, whereas the flange contact surface 121 of the flange ring 15 opposite the flange contact surface 122, is not provided with a chrome-steel alloy.

By using a chrome-steel alloy as a coating of the flange contact surfaces 121, 122, a coefficient of friction-increasing coating is formed between the rotor shaft 12 and the connection part 13, such that by tightening the screws 18 the friction coefficient, or respectively the coefficient of friction, and the frictional-locking is or will be increased between the rotor shaft and the connection part 13.

Figure 3:
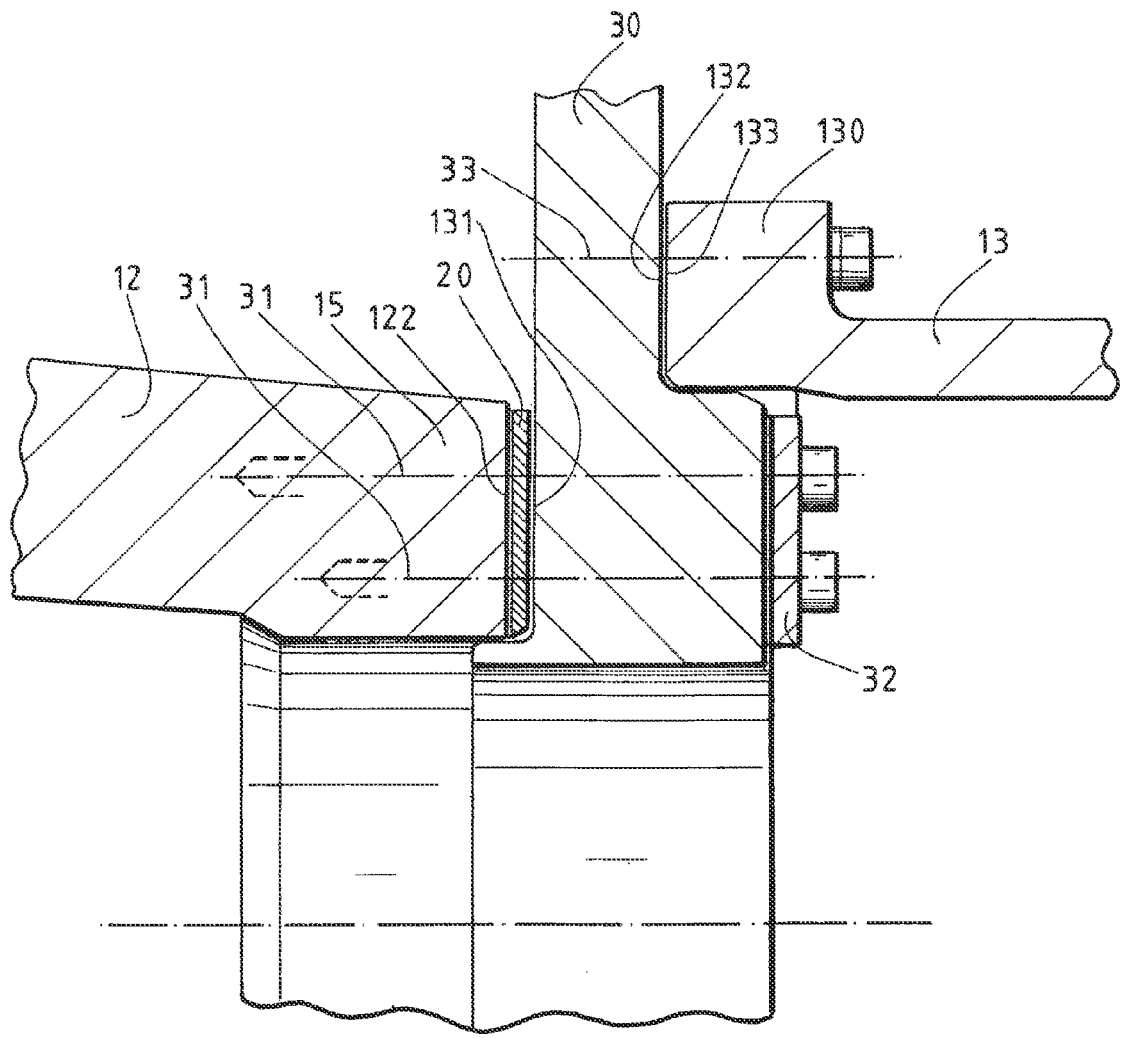
FIG. 3 is an elevation view of the connection transition of the rotor shaft to the gearbox according to an embodiment.

FIG. 3 schematically shows another example embodiment of a connection of a rotor shaft 12 to a gearbox flange 130 of a gearbox (not shown further) according to the embodiment shown in FIG. 2. Here, a locking disk 30 is disposed between the rotor shaft 12 having the flange ring 15 and the gearbox flange 130, wherein the locking disk has both a contact surface 131 for the rotor shaft 12 as well as a contact surface 132 for the gearbox flange 130.

In order to improve the connection between the rotor shaft 12 and the locking disk 30, or respectively between the rotor shaft 12 and the gearbox flange 130, in the strength thereof, the contact surfaces 131, 132, which are formed as flange-mounting surfaces for the flange of the rotor shaft 12 and for the gearbox flange 130, are provided on the surface with the coating composed of chrome-steel alloy.

Furthermore, the locking disk 30 is provided with through holes, so that schematically indicated screws 31, which are inserted on the gearbox flange side, a washer 32, the locking disk 30 and the provided through holes of the intermediate connection bodies 20 penetrate and open into tapped blind holes of the rotor shaft 12.

Intermediate connection bodies 20 are disposed between the contact surface 131 and the flange contact surface 122 of the flange ring 15 of the rotor shaft 12, wherein the intermediate connection bodies 20 can also be provided with a chrome-steel alloy as a coating.

Furthermore the contact surface 132 and the flange contact surface 133 of the gearbox flange 130 are disposed opposite each other between the locking disk 30 and the gearbox flange 130, wherein one of the two contact surfaces 132, 133 is formed at least having one chrome-steel alloy. Here, both the contact surface 131 as well as the flange contact surface 133 of the gearbox flange 130 can have a chrome-steel alloy that increases the coefficient of friction.

In a further embodiment it is conceivable that the contact surface 132 of the locking disk 30 formed as a flange-mounting surface and the flange contact surface 133 of the gearbox flange 130 are each provided with an outer chrome-steel alloy.

In order to connect the locking disk 30 to the gearbox flange 130, these are braced together using the schematically indicated screws 33.

In addition in one embodiment (not shown here) it is provided that connection intermediate bodies, as are disposed between the locking disk 30 and the flange ring 15 of the rotor shaft 12, are disposed between the locking disk 30 and the gearbox flange 130. Here too, the gearbox flange 130 and the locking disk 30 are connected together using schematically indicated screws 33. The intermediate connection bodies according to the invention are preferably connection intermediate bodies coated on both sides with a chrome-steel alloy, such that improved force-locking connections with higher friction-locking and higher coefficient of friction are attained.

The embodiment shown in FIG. 3 is the multiple combination or a series connection of several connections according to the invention.

Figure 4A:
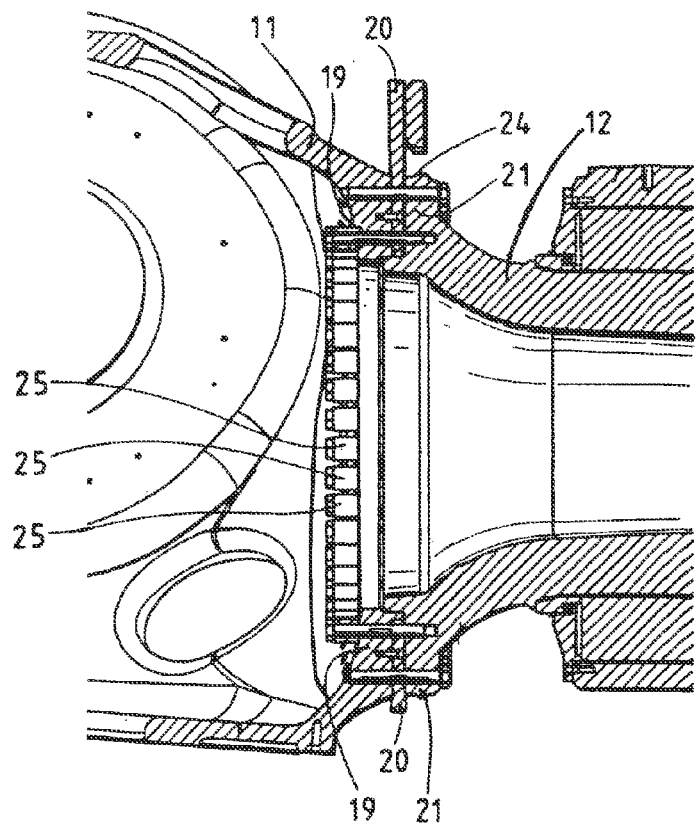
FIG. 4a is a sectional elevation view of the flange connection of the rotor hub to the rotor shaft.

FIG. 4a also shows a detailed view of a cross-section of the connection between the rotor shaft 12 and the rotor hub 11 (see FIG. 1). For this, the rotor hub 11 has a flange ring 19 on the inside with corresponding bore holes, into which bolts or screws can be inserted and are connected to the front side of the rotor shaft 12. For this, corresponding tapped blind holes are provided on the rotor shaft 12 for receiving the screws or bolts.

The screws or bolts are inserted from the inside of the rotor hub 11 and connected to the rotor shaft 12. Furthermore, in order to form a reciprocal flange connection on the rotor shaft 12, a flange ring 21 with corresponding bore holes are provided for receiving bolts or screws. The bolts are here inserted into the bore holes of the flange ring 21 from the side facing away from the rotor hub 11 such that the bolts or screws penetrate correspondingly formed (tapped blind or through) holes on the rotor hub 11. The bolts of the outer row of the flange ring 21 are arranged opposite the bolts of the inner row of the flange ring 19 of the rotor hub 11. The hole circle of the bore holes of the flange ring 21 is greater than the hole circle of the bore holes of the flange ring 19.

Overall, this enables a double-row screw flange connection of the two mechanically highly stressed components. The assembly takes place in that the rotor hub and the rotor shaft are aligned with each other, then the screw connection of the row of bolts on the exterior flange ring 21 of the rotor shaft 12 takes place and then the connection elements in the form of bolts or screws are screwed in the inside of the rotor hub 11 on the interior flange ring 19. Then the bolts or screws are preloaded with a predetermined preload force. This enables a robust flange connection of the rotor hub 11 to the rotor shaft 12.

Using casings 25 under the screw heads of the inner screw row, it is possible to use uniform screw lengths for the purpose of standardization. A track 24, which functions as a contact track for a lightning arrester (not shown), is arranged on the outer flange ring 21.

In order to form a coefficient of friction-increasing connection between the rotor hub 11 and the rotor shaft 12, a row of connection intermediate bodies 20 is disposed between the two ends of the rotor shaft 12 and the rotor hub 11, or respectively between the flange rings 19 and the flange ring 21. These bodies have on both contact surfaces facing the flange ring 19, 21 a surface coated with a chrome-steel alloy, so that the friction locking, upon tightening the row of bolts at the flange rings 19, 21, leads to improved friction locking.

Through the connection intermediate bodies 20 according to the invention with the coefficient of friction-increasing coating thereof, composed of chrome-steel alloy on both sides of the components, rotor hub 11 and rotor shaft 12, an arrangement is achieved for preventing relative movements between the components (rotor hub 11 and rotor shaft 12) that interact, braced against each other.

In particular, the rotor hub 11 is a component made of a cast material, e.g. nodular graphite cast iron, or made of simple structural steel, wherein the contact surface of the flange ring 21 for the rotor hub is preferably processed to be mechanically smooth, e.g. RZ 16.

Furthermore, the rotor shaft 12 as a second component is implemented as a steel component (structural steel or heat-treated steel) or as a cast component. Preferably the contact surface for the rotor hub 11 can be sandblasted, e.g. SA3, wherein the surface can also be hardened in further embodiments.

The preloading applied by the connection elements or bolts between the rotor shaft 12 and the rotor hub 11 should achieve surface compressions on the contact surfaces in the range of 60 to 220 $N/mm^2$, preferably between 90 and 200 $N/mm^2$.

The flange ring 19 of the rotor hub 11 has bore holes, which are disposed in a circle, wherein the connection region of the rotor hub 11 to the rotor shaft 12 on the flange ring 19 has a diameter of more than 0.5 m overall.

FIG. 4a also shows that the intermediate connection bodies 20 can simultaneously be used as a locking disk for a rotor lock. The locking disk is made up of three identical segments, which are provided as intermediate connection bodies 20. The locking occurs via two locking devices, in which bolts, not shown, are pushed through the bolt receivers. In total, several receivers are positioned such that each rotor blade can be locked in a vertical and a horizontal position.

Figure 4B:
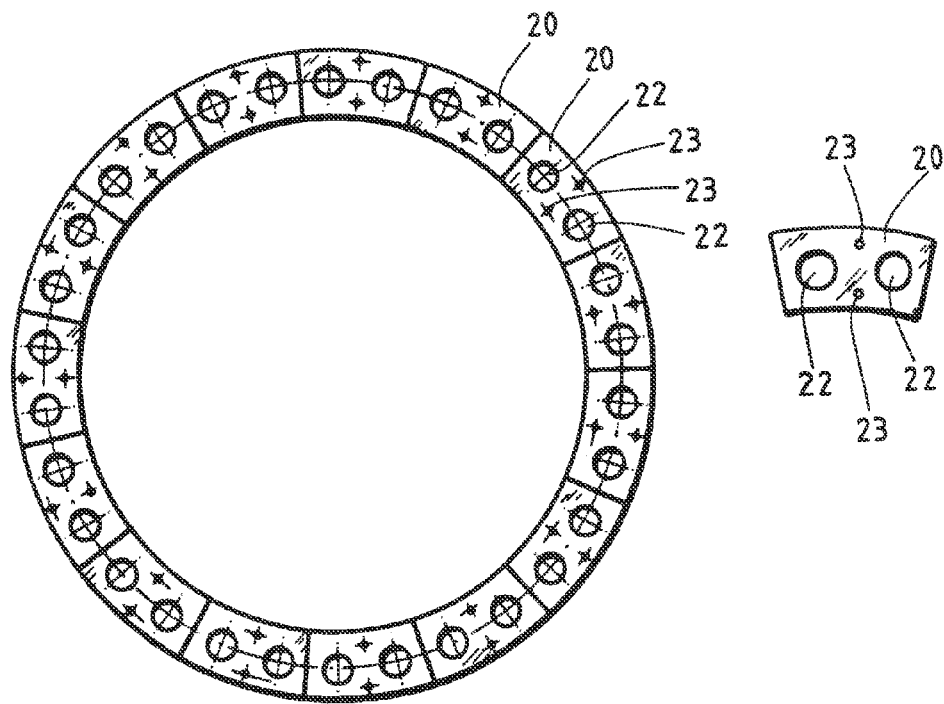
FIG. 4b is an elevation view of circular segment intermediate bodies.

FIG. 4b shows a schematic view of an embodiment of the arrangement of intermediate connection bodies 20 at a component, or respectively at a flange of a component. The left region shows a circular arrangement of the intermediate connection bodies 20 and the right region of the figures shows in each case a single view of the intermediate connection bodies 20.

The intermediate connection bodies 20 are approximately 5 mm thick and 200 to 600 mm long for example. Smaller elements reduce the coating costs, but increase the assembly effort such that the specific dimensions are to be adapted to the respectively preferred and predetermined use on a case-by-case basis.

By means of the intermediate connection bodies 20, coated on one side with a chrome-steel alloy, preferably on both sides facing the contact surfaces of components, between the contact surfaces of two components, in particular the contact surfaces of a flange connection between the components, a type of segmented ring is formed from the intermediate connection bodies 20. The intermediate connection bodies 20 are designed as a partial segment of a circular arrangement.

The intermediate connection bodies 20 can have one or more bore holes 22 formed as through holes, so that the intermediate connection bodies 20 are penetrated by bolts or screws of a flange connection between two components to be connected. Moreover, the intermediate connection bodies 20 have smaller bore holes 23 so that mounting elements in the form of counter-sunk screws penetrate the bore holes 23, whereby for example a mounting of the intermediate connection bodies 20 on a flange ring is enabled or simplified.

The intermediate connection bodies 20 can hereby be mounted on the contact surfaces of the components through the insertion of screws or other mounting elements into the bore holes, wherein the contact surfaces preferably have corresponding tapped blind holes for receiving threads.

All named characteristics, including those taken from the drawings alone, and individual characteristics, which are disclosed in combination with other characteristics, are considered individually and in combination as essential to the invention. Embodiments according to the invention can be fulfilled through individual characteristics or a combination of several characteristics.

LIST OF REFERENCE NUMBERS 11 rotor hub
12 rotor shaft
13 connection part (gear box)
14 flange connection
15 flange ring
16 bore hole
17 bore hole
18 screws
19 flange ring
20 connection intermediate body
21 flange ring
22 bore hole
23 bore hole
24 track
25 casing
30 locking disk
31 screws
32 washer
33 screws
121 flange contact surface
122 flange contact surface
130 gearbox flange
131 contact surface
132 contact surface
133 flange contact surface
WEA Wind power plant

The invention claimed is:

1. An arrangement of two components (12, 13, 30) of a wind power plant, comprising:
   a first component (12, 13) that has a flange (15, 130) having a flange contact surface (121, 122, 133), and
   a second component (30) that has a flange-mounting surface (131, 132) for the flange (15, 130) of the first component (12, 13),
   wherein the flange contact surface (122, 133) of the first component (12, 13) and the flange-mounting surface (131, 132) of the second component (30) are arranged opposite from each other, and
   wherein at least one of the flange contact surface (121, 122, 133) of the flange (15, 130) and the flange-mounting surface (131, 132) of the second component (30) has a chrome-steel alloy coating that is applied using an arc welding method, the chrome-steel alloy coating being a friction increasing coating.

2. The arrangement according to claim 1, wherein the first component (12, 13) and the second component (30) are braced together using connection elements.

3. The arrangement according to claim 2, wherein the first component (12, 13) is a gearbox input shaft (130) and the second component (12, 30) is a rotor locking disk (30).

4. The arrangement according to claim 2, wherein the connection elements are screws or bolts.

5. The arrangement according to claim 1,
   wherein the chrome-steel alloy coating on at least one of the two components is on a cast material for at least one of a rotor shaft, a rotor hub, and a rotor locking disk, with compressions due to pretensioning of 125 MPa have coefficients of friction from 0.59 to 0.61, and with compressions of 75 MPa have coefficients of friction from 0.45 to 0.47, and
   wherein the chrome-steel alloy coating on at least one of the two components is on a cast cast material for a planet carrier, with compressions through pretensioning of 75 MPa have coefficients of friction from 0.44 to 0.48.

6. The arrangement according to claim 1,
   wherein one or more connection intermediate bodies (20) are disposed between the flange contact surfaces (121, 122, 133) or one or more of the connection intermediate bodies (20) are disposed between the flange contact surface (21, 122) of the first component (12, 13) and the flange-mounting surface (131, 132) of the second component (30),
   wherein the connection intermediate bodies (20) are provided with a coating of chrome-steel alloy.

7. The arrangement according to claim 6, wherein the connection intermediate bodies (20) are plate-shaped or block-like.

8. The arrangement according to claim 6, wherein the intermediate connection bodies (20) form a segmented annular ring through arrangement between the first component (12, 13) and the second component (30).

9. The arrangement according to claim 6, wherein the connection intermediate bodies (20) are mechanically connected to at least one of the first component (12, 13) and the second component (30) using mounting elements.

10. The arrangement according to claim 9, wherein the mounting elements are screws or clamps.

11. The arrangement according to claim 1, wherein at least one of the flange contact surface (121, 122, 133) of the first component (12, 13) and the flange-mounting surface (131, 132) of the second component (30) are ring-like.

12. The arrangement according to claim 1, wherein the first component (12, 13) is a rotor shaft (12) and the second component (30) is a rotor locking disk (30).

13. The arrangement to claim 1, wherein the connection of the first component (12, 13) and the second component (30) is a force-locking detachable connection.

14. The arrangement according to claim 13, wherein the force-locking detachable connection is at least one of a transverse-force-loaded connection, a torsion-loaded connection, and a screw connection.

15. The arrangement according to claim 1, wherein at least one of the first component (12, 13) and the second component (30) is a cast component.

16. A wind power plant (WEA) having an arrangement of a first component (12, 13) and a second component (30) according to claim 1.

17. A method for processing at least one component of a wind power plant, comprising the steps of:
provinding an arrangement of two components of a wind power plant that includes a first component that has a flange having a flange contact surface and a second component that has a flange-mounting surface for the flange of the first component, wherein the flange contact surface of the first component and the flange-mounting surface of the second component are arranged opposite from each other, wherein the components of the wind power plant have a diameter of more than 0.5 m,
connecting the components to each other so that each of the components has contact surfaces facing each other, and
coating at least one of the contact surfaces of the components connected together with a chrome-steel alloy that is applied using an arc welding method, the chrome-steel alloy being a friction increasing coating.

18. The method of claim 17, wherein the components of the wind power plant have a diameter of more than 1.5 m.

* * * * *